United States Patent
Oh et al.

(10) Patent No.: US 8,081,228 B2
(45) Date of Patent: Dec. 20, 2011

(54) APPARATUS AND METHOD FOR PROCESSING IMAGE DATA

(75) Inventors: Sung Jo Oh, Suwon-si (KR); Suk Ju Kim, Suwon-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 645 days.

(21) Appl. No.: 12/179,570

(22) Filed: Jul. 24, 2008

(65) Prior Publication Data

US 2009/0033760 A1 Feb. 5, 2009

(30) Foreign Application Priority Data

Aug. 1, 2007 (KR) ........................ 10-2007-0077542

(51) Int. Cl.
*H04N 5/228* (2006.01)
(52) U.S. Cl. .................................................. 348/222.1
(58) Field of Classification Search .................. None
See application file for complete search history.

(56) References Cited

U.S. PATENT DOCUMENTS

| | | | |
|---|---|---|---|
| 5,526,047 A * | 6/1996 | Sawanobori | 348/222.1 |
| 6,661,452 B1 * | 12/2003 | Nishikawa | 348/222.1 |
| 7,719,579 B2 * | 5/2010 | Fishman et al. | 348/231.99 |
| 2003/0164890 A1 * | 9/2003 | Ejima et al. | 348/333.1 |
| 2003/0193602 A1 * | 10/2003 | Satoh et al. | 348/333.12 |
| 2004/0169895 A1 * | 9/2004 | Hashizume et al. | 358/474 |
| 2005/0099518 A1 * | 5/2005 | Mihara et al. | 348/333.05 |
| 2006/0061667 A1 * | 3/2006 | Tunoda | 348/222.1 |
| 2006/0132618 A1 * | 6/2006 | Fujita et al. | 348/222.1 |

* cited by examiner

*Primary Examiner* — Sinh Tran
*Assistant Examiner* — Jason Flohre
(74) *Attorney, Agent, or Firm* — Jefferson IP Law, LLP (57) ABSTRACT

An apparatus and method for processing image data are provided. Using the method of the present invention, image data output from an image sensor can be rapidly processes and the necessary amount of buffer memory can be reduced. To this end, first image data of one frame is processed and converted into second image data in an image sensor part. The converted second image data is stored in a plural buffer memory having a plurality of storage areas. The second image data is sequentially read from the plural buffer memory, and then encoded.

14 Claims, 5 Drawing Sheets

APPARATUS AND METHOD FOR PROCESSING IMAGE DATA

PRIORITY

This application claims the benefit under 35 U.S.C. §119(a) of a Korean patent application filed in the Korean Intellectual Property Office on Aug. 1, 2007 and assigned Serial No. 2007-0077542, the contents disclosure of which is hereby incorporated by reference.

BACKGROUND OF THE INVENTION

1. Field of the Invention

The present invention relates to image processing technology. More particularly, the present invention relates to an apparatus and method that processes image data output from an image sensor.

2. Description of the Related Art

As technology has developed and new functions have become available, the market for portable terminals has grown rapidly. That is, the new functions provided on portable terminals are stimulating consumers' purchasing appetite. In recent years, portable terminals have been provided with a variety of application programs to comply with users' requirements and to provide users with various additional services. For example, portable terminals include functions allowing use of voice information, text information, image information, as well as an MP3 player function, a game service, etc. In particular, portable terminals including an image sensor for capturing images of subjects have gradually been developed and adopted by users.

Conventional portable terminals having an image sensor process image data, output from the image sensor, based on an entire frame, i.e., each screen. Therefore, they require a large buffer memory and take a long time to process the image data. For example, when an image sensor has a size of 1.3 mega pixels, the buffer memory requires a size of 2.3 MB in order to buffer the image data. When an image sensor has a size of 5 mega pixels, the buffer memory requires a size of 9.3 MB to buffer the image data. Accordingly, the conventional image processing of an entire frame requires a large memory capacity for buffering and takes a long time to complete, both of which are an inconvenience for the user.

SUMMARY OF THE INVENTION

An aspect of the present invention is to address at least the above-mentioned problems and/or disadvantages and to provide at least the advantages described below. Accordingly, an aspect of the present invention is to provide an apparatus and method that can rapidly process image data output from an image sensor.

Another aspect of the present invention is to provide an apparatus and method that can process image data using a relatively small sized buffer memory.

In accordance with an aspect of the present invention, a method for processing image data is provided. The method includes processing first image data of one frame and converting the first image data into second image data in an image sensor part, sequentially storing the converted second image data in a plural buffer memory having a plurality of storage areas and reading and sequentially encoding the second image data from the plural buffer memory, and encoding the read second image data.

In accordance with another aspect of the present invention, a method for processing image data is provided. The method includes processing first image data, which is output based on part of lines of one frame and converting the first image data into second image data in an image sensor part, sequentially storing the converted second image data in a plural buffer memory having a plurality of storage areas and sequentially reading and encoding the second image data from the plural buffer memory, and displaying, when the read second image data forms one frame, the read second image data on a screen.

In accordance with yet another aspect of the present invention, an apparatus for processing image data is provided. The apparatus includes an image sensor for outputting one captured frame as first image data, an image pre-processor for processing the output first image data and converting the processed first image data into second image data, a plural buffer memory having a plurality of storage areas in which the converted second image data is sequentially stored and an image post-processor for sequentially reading and encoding the second image data from the plural buffer memory.

According to another aspect of the present invention, the apparatus may further include a size adjusting unit for sequentially reading second image data from the plural buffer memory and outputting the read second image data when the read second image data forms one frame. Here, the size adjusting apparatus unit sequentially reads the second image data from the plural buffer memory, adjusts the size of the read second image data to meet the screen standard, buffers the adjusted image data, and displays the second image data when the second image data is buffered and forms one frame.

According to still another aspect of the present invention, the apparatus may further include a display unit for displaying the output frame of the second image data.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
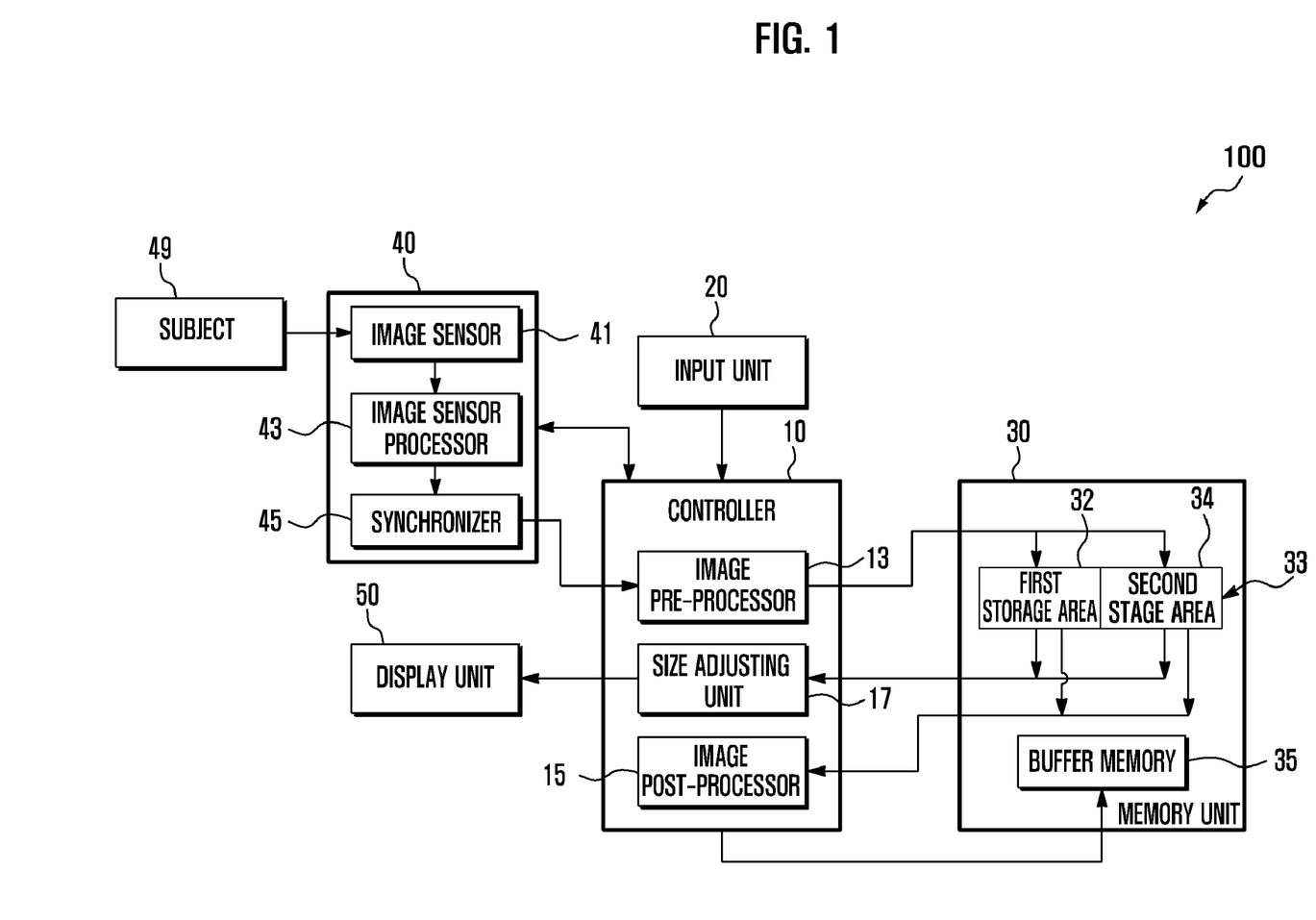
FIG. 1 is a schematic block diagram illustrating an image data processing apparatus according to an exemplary embodiment of the present invention.

FIG. 1 is a schematic block diagram illustrating an image data processing apparatus 100 according to an exemplary embodiment of the present invention.

As shown in FIG. 1, the image data processing apparatus 100 includes a controller 10, an input unit 20, a memory unit 30, an image sensor part 40, and a display unit 50.

The image data processing apparatus 100 can be applied to any portable terminal having an image capture function. Such portable terminals include a digital camera, a wireless terminal, a Personal Digital Assistant (PDA) terminals, a Portable Multimedia Players (PMP's), etc.

The controller 10 refers to a microprocessor that controls the operation of the image data processing apparatus 100. The controller 10 includes an image pre-processor 13, an image post-processor 15 and a size adjusting unit 17 that process the image data of a captured subject. In the illustrated exemplary embodiment, the controller 10 includes the image pre-processor 13, image post-processor 15, and size adjusting unit 17.

The input unit 20 includes a plurality of keys through which the image data processing apparatus 100 can be operated. The input unit 20 generates key input data according to a user's key selection and the outputs the data to the controller 10. The input unit 20 can generate the user's commands, such as capturing a subject, storing image data of the captured subject, displaying stored image data, etc. The input unit 20 can be implemented by any of various input devices, such as a pointing device (for example, a key pad, a touch pad), a touch screen, etc.

The memory unit 30 stores programs for controlling the operations of the image data processing apparatus 100 and data that is generated as the programs are executed. The memory unit 30 may include one or more volatile memories and/or one or more non-volatile memories. In particular, the memory unit 30 stores an application program for processing data of captured images and data generated when the application program is executed. In addition, the memory unit 30 stores encoded image data.

The image sensor part 40 generates image data from a captured subject 49, which is hereinafter referred to as "first image data", and outputs the generated first image data.

The display unit 50 displays general status information of the apparatus 100 as well as an image in a preview state in a capture mode, captured images, and image data stored in the memory unit 30. The display unit 50 may be implemented by an LCD or a touch screen. Such a touch screen serves to simultaneously perform functions of a display unit and an input unit.

Referring again to image sensor part 40, the image sensor part 40 includes an image sensor 41, an Image Sensor Processor (ISP) 43, and a synchronizer 45. The image sensor 41 acquires optical signals of the subject 49 and converts them into analog signals. The ISP 43 converts the analog signals into digital signals, i.e., first image data. The synchronizer 45 synchronizes vertical and horizontal reference signals of the first image data output from the ISP 43 and then outputs the synchronized signals to the image pre-processor 13. The synchronizer 45 outputs one frame of the first image data based on a certain number of lines. That is, the image pre-processor 13 does not output the entire frame of the captured image at a single time, but instead outputs the frame by a group of lines at a time. The certain number of lines may refer to a multiple number of 8. In an exemplary embodiment, one frame of the first image data is output based on groups of 8 lines. The synchronizer 45 processes the first image data in a decimation process, such as windowing, sub-sampling, etc. and then outputs the result.

The first image data is transmitted from the synchronizer 45 to the image pre-processor 13 according to the control of a Direct Memory Access (DMA) bus controller which is not shown. More specifically, the DMA bus controller stores the first image data successively output from the synchronizer 45 to the memory unit 30 through a DMA bus. After the first image data of 8 lines is stored in the memory unit 30, the DMA bus controller sequentially transmits the first image data of 8 lines to the image pre-processor 13.

The memory unit 30 includes a plural buffer memory 33 for inputting and outputting second image data in a capture mode, and a buffer memory 35 for buffering encoded second image data. The plural buffer memory 33 includes first and second storage areas 32 and 34 in which the second image data is alternately stored. The plural buffer memory 33 and the buffer memory 35 may be implemented by a volatile memory. The second image data will be explained in detail in the description of the image pre-processor 13.

In an exemplary embodiment as illustrated in FIG. 1, the plural buffer memory 33 is implemented by two storage areas (32 and 34). However, it should be understood that the number of plural buffer memories of the present invention is not limited by the illustrated example. That is, the plural buffer memory can be implemented to include only one storage area or more than two storage areas.

The image pre-processor 13 of the controller 10 processes the first image data from the synchronizer 45 and converts it into the second image data. The image pre-processor 13 stores the converted second image data alternately in the first and second storage areas 32 and 34 of the plural buffer memory 33. More specifically, the image pre-processor 13 converts the first image data into the second image data having a raw format and then stores it in the plural buffer memory 33. Generally, the size of the second image data stored in the plural buffer memory 33 is approximately twice the size of the pixel of the image sensor 41. For example, when the image sensor 41 is implemented having a 1.3 mega pixel size, the size of the second image data becomes 20 kilobytes (1280× 8×2 byte=20,480 bytes). Also, when the image sensor 41 is implemented having a 5 mega pixel size, the size of the second image data becomes 40 kilobytes (2,560×8×2 bytes=40,960 bytes). Since the image pre-processor 13 processes the first image data based on 8 lines, the size of the plural buffer memory 33 can be reduced. Of course, the pre-processor 13 may process the first image data based on a multiple of 8 lines (e.g. 16 lines, 24 lines, etc.) depending on other system requirements or memory availability.

The image post-processor 15 of the controller 10 alternately reads the second image data from the first and second storage areas 32 and 34 of the plural buffer memory 33, encodes the second image data, and then stores the encoded second image data in the buffer memory 35. While the image post-processor 15 reads the second image data from the first storage area 32, the image pre-processor 13 stores the converted second image data in the second storage area 34. That is, while the image post-processor 15 finishes encoding the second image data of the first storage area 32 and then reads the second image data from the second storage area 34, the image pre-processor 13 stores the second image data in the first storage area 32. The image post-processor 15 performs an encoding operation until one frame is completely encoded. While the image post-processor 15 is encoding the second image data from one of the storage areas (32 and 34) of the plural buffer memory 33, the image pre-processor 13 finishes storing the second image data in another one of the storage areas (34 and 32).

The image post-processor 15 can decode the second image data stored in the memory unit 30, so that the decoded second image data is displayed on the display unit 50 through the size adjusting unit 17. The image post-processor 15 can be implemented by a Joint Photographic Experts Group (JPEG) codec, a Moving Pictures Experts Group (MPEG) codec, a wavelet codec, etc. in order to encode and decode image data.

The size adjusting unit 17 of the controller 10 adjusts the size of an image in a preview state of a capture mode and of a captured image, and displays the adjusted image on the display unit 50. The size adjusting unit 17 sequentially reads the second image data from the plural buffer memory 33, adjusts the size of the read second image data so as to meet the screen standard of the display unit 50, and buffers them. When the buffered second image data forms one frame, the size adjusting unit 17 outputs the second image data to the display unit 50.

Figure 4:
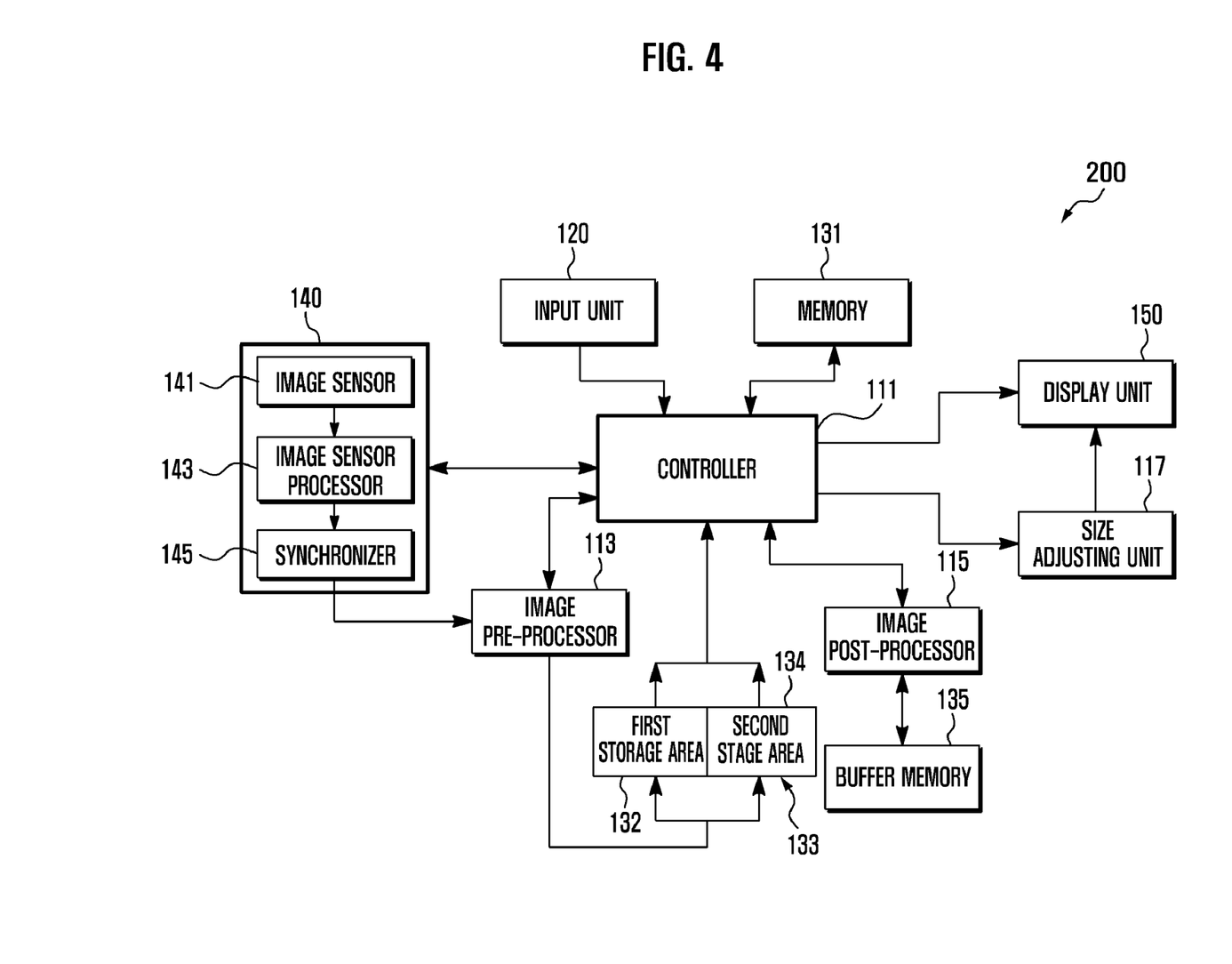
FIG. 4 is a schematic block diagram illustrating an image data processing apparatus according to an exemplary embodiment of the present invention.

FIG. 4 is a schematic block diagram illustrating an image data processing apparatus 200 according to an exemplary embodiment of the present invention.

Referring to FIG. 4, the image data processing apparatus 200 includes a controller 111, an image pre-processor 113, an image post-processor 115, and a size adjusting unit 117. However, in comparison with the exemplary embodiment of FIG. 1, the exemplary apparatus 200 illustrated in FIG. 4 is implemented in such a way that the controller 111 does not include the image pre-processor 113, the image post-processor 115, or the size adjusting unit 117. Rather, these components are provided independently. Although not shown in the drawings, in another exemplary implementation, the pre-processor 113, image post-processor 115 and size adjusting unit 117 may be implemented as one module. The data processing apparatus 200 also includes a memory unit 131, a plural buffer memory 133 and a buffer memory 135, wherein the plural buffer memory includes first and second storage areas 132 and 134. In comparison to the exemplary embodiment of FIG. 1, the memory components of image data processing apparatus 200 may be implemented as separated types. That is, a type where the memory 131, the plural buffer memory 133 and the buffer memory 135 are individually installed in the image data processing apparatus 200. In addition, the memory components may also be implemented to have a package type or a multi-chip module type. A synchronizer 145 is installed in an image sensor part 140. However, the synchronizer 145 may be individually implemented to be separated from the image sensor part 140. In addition, the synchronizer 145, image pre-processor 113, image data post-processor 115 and size adjusting unit 117 can be implemented as a single module. The image sensor further includes an image sensor 141 and an image sensor processor 143. Because the functions of the image sensor 141 and the image sensor processor 143 are substantially the same as that of the image sensor 41 and image sensor processor 43 discussed above with respect to FIG. 1, a more detailed description thereof is omitted for conciseness. The image data processing apparatus 200 also includes an input unit 120 and a display unit 150. Again, because the functions of the input unit 120 and display unit 150 are substantially the same as that of input unit 20 and display unit 50 discussed with regard to FIG. 1, a more detailed description thereof is omitted for conciseness.

Image Data Processing Method

Figure 2A:
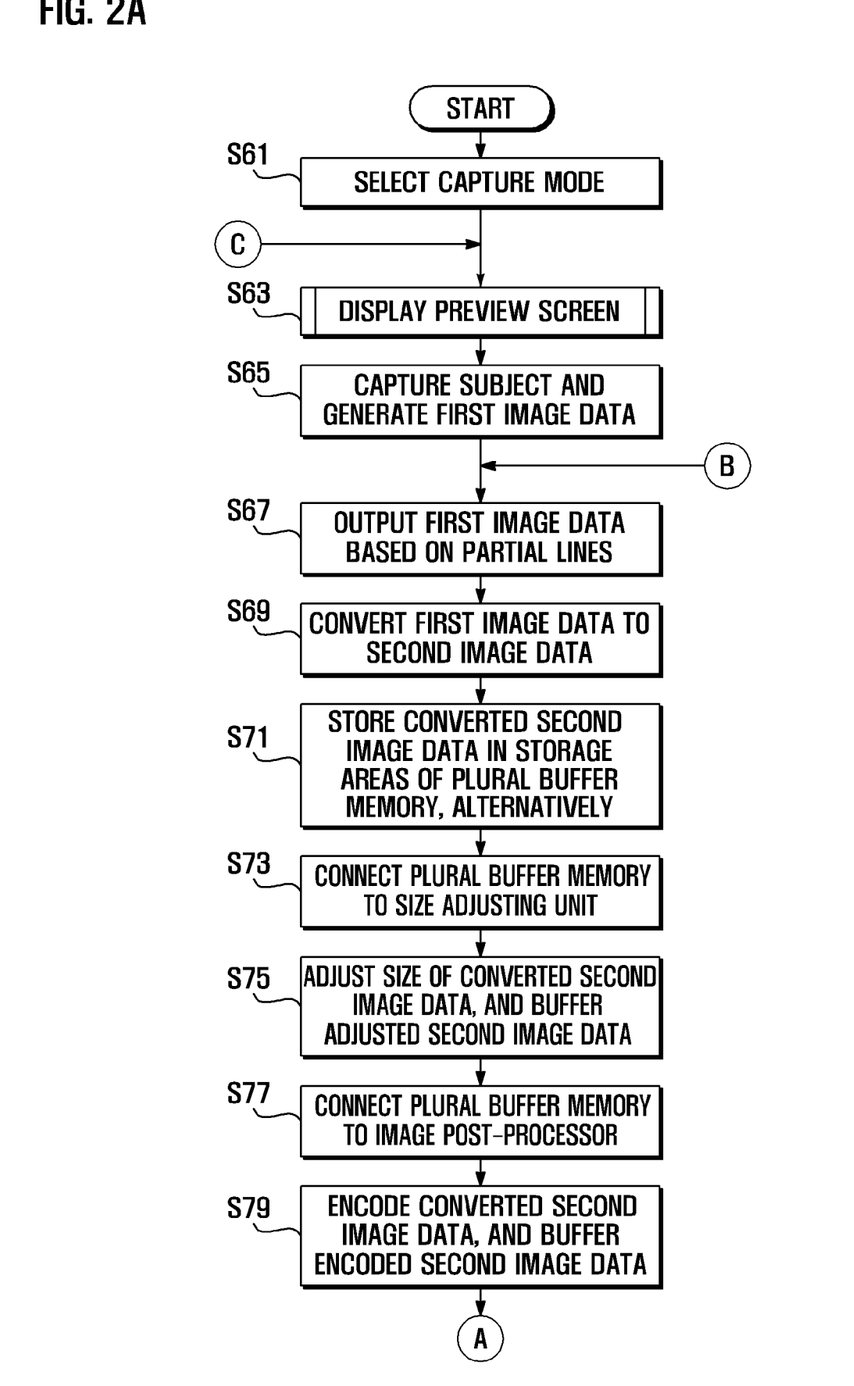
FIGS. 2A and 2B are a flowchart describing an image data processing method according to an exemplary embodiment of the present invention.
Figure 2B:
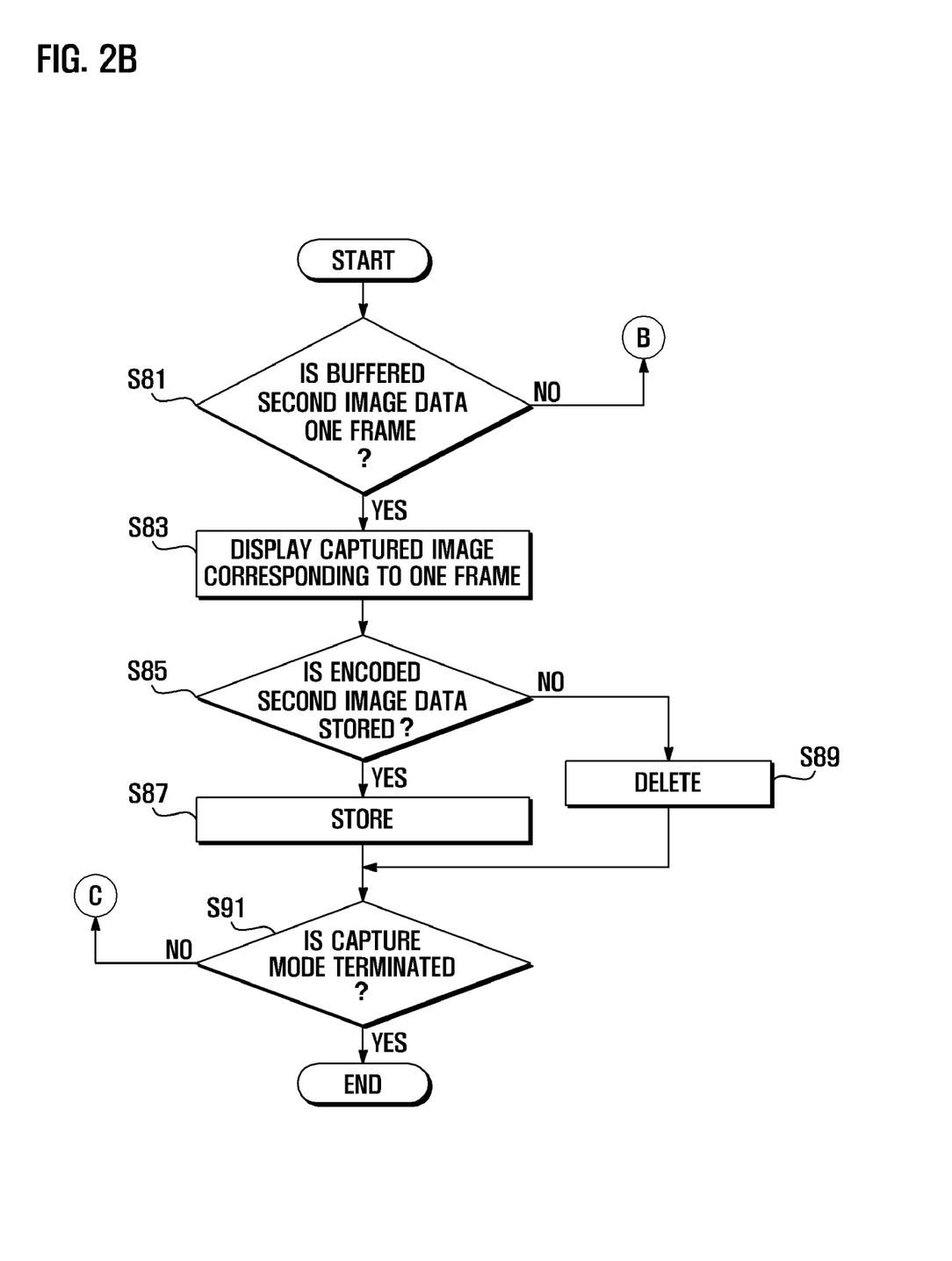
Figure 3:
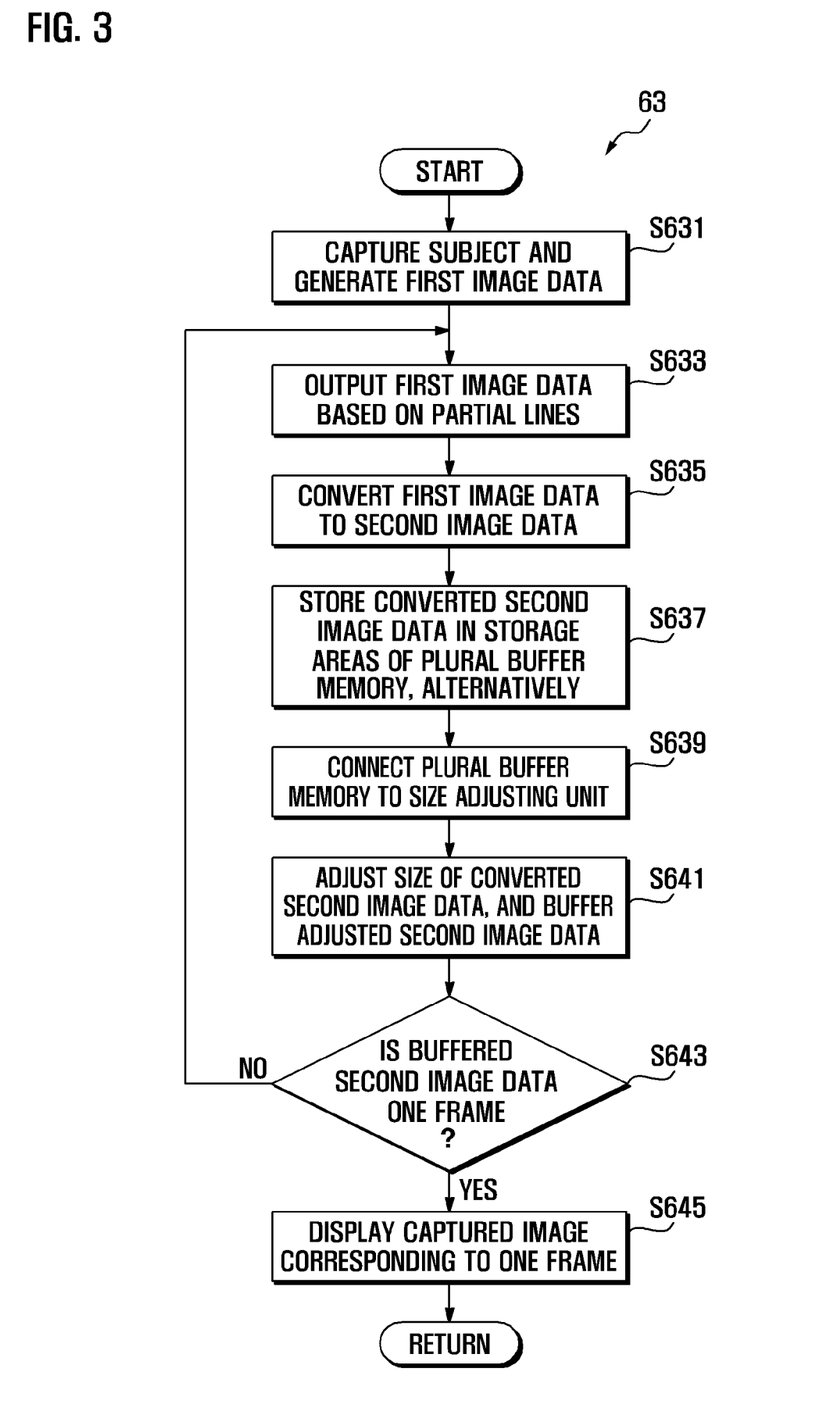
FIG. 3 is a flowchart describing an exemplary process for displaying a preview screen of FIG. 2A.

FIGS. 2A and 2B are a flowchart describing an image data processing method according to an exemplary embodiment of the present invention and FIG. 3 is a flowchart describing an exemplary process for displaying a preview screen of FIG. 2A.

With reference to FIGS. 1 through 3, the following description is of a method for processing image data in an image data processing apparatus 100, according to an exemplary embodiment of the present invention. Of course, although reference is made in the following description to image data processing apparatus 100 and the specific components thereof (e.g. controller 10, display unit 50, etc.), it is to be understood that the exemplary process is not limited to execution by the image data processing apparatus 100 but is also applicable to the apparatus 200 of FIG. 4 and others as may be appropriate.

When a capture mode is selected according to a user's input in step S61, for example by a key selection input by the user, the controller 10 executes the capture mode and displays a preview screen on the display unit 50 in step S63. The image of a subject can be viewed through the preview screen or a view finder. The process of displaying a preview screen at step S63 will be described in more detail later with reference to FIG. 3.

When the subject is viewed through the preview screen or view finder and a key corresponding to a shutter is selected, the image sensor part 40 captures the subject and generates a first image data of the captured subject according to the control of the controller 10 in step S65.

In step S67, the synchronizer 45 of the image sensor part 40 outputs the first image data to the image pre-processor 13. The image data output by the synchronizer 45 includes a group of lines, for example, 8 lines of the frame of the captured image. The image pre-processor 13 converts the first image data based on 8 lines into a second image data having a raw format in step S69, and stores the converted data alternately in first and second storage areas 32 and 34 of the plural buffer memory 33 in step S71. For example, a time point when the image pre-processor 13 alters between the storage areas (32 and 34) to store the second image data therein may also be the time point when the second image data based on 8 lines has just been stored therein.

In step S73 the controller 10 connects the plural buffer memory 33 to the size adjusting unit 17 so that the captured image can be output on the screen. The size adjusting unit 17 sequentially reads the second image data from the plural buffer memory 33 and adjusts the size of read image data according to the screen standard in step S75.

In step S77, the controller 10 connects the plural buffer memory 33 to the image post-processor 15. In step S79, the image post-processor 15 sequentially reads the second image data from the plural buffer memory 33, encodes the read image data, and buffers the encoded data in the buffer memory 35. In an exemplary implementation, the size adjusting unit 17 and the image post-processor 15 read the second image data from the same storage areas (32 and 34) of the plural buffer memory 33. The size adjusting unit 17 and the image post-processor 15 read the second image data from the storage areas (32 and 34) that have already stored the second image data based on 8 lines.

Afterwards, as shown in FIG. 2B, the controller 10 determines whether the second image data, buffered in the size adjusting unit 17 and the image post-processor 15, forms one frame in step S81. When the second image data does not form one frame at step S81, the controller 10 repeats steps S67 to S79 until the second image data forms one frame.

If the size adjusting unit 17 and the image post-processor 15 read the second image data from the first storage area 32, the image pre-processor 13 stores the second image data in the second storage area 34. When a series of steps from S67 to S79 is repeated as the second image data has not formed one frame at step S81, the size adjusting unit 17 and the image post-processor 15 read the second image data from the second storage area 34. In that case, the image pre-processor 13 stores the second image data in the first storage area 32. That is, while the second image is stored in one of the storage areas (32 and 34) of the plural buffer memory 33, the second image data is simultaneously read from another one of the storage areas (34 and 32).

On the other hand, when the second image data forms one frame at step S81, the size adjusting unit 17 outputs the buffered second image data of one frame to the display unit 50 in step S83. The display unit 50 displays the second image data of one frame, i.e., a captured image, on the screen. The controller 10 also determines if a user desires to store the captured image in step S85. In an exemplary implementation, the controller may display a screen on the display 50 for the user to decide whether to store or delete the image. When the user inputs a command that corresponds to the storage of the captured image, for example by using an input key, the controller 10 stores the encoded second image data that is stored in the buffer memory 35 in step S87. On the contrary, when the user inputs a delete command, the controller 10 deletes the encoded second image data that is stored in the buffer memory 35 in step S89.

The controller 10 determines whether the capture mode is terminated in step S91. If the capture mode is not terminated, the controller 10 repeats steps S63 to S89 until the capture mode is terminated.

FIG. 3 is a flowchart describing an exemplary process for displaying a preview screen of FIG. 2A.

With reference to FIG. 3, the following describes in more detail an exemplary process of displaying a preview screen associated with step S63. The step S63 is similar to the process of displaying a captured image on a screen. Of course, although reference is made in the following description to image data processing apparatus 100 and the specific components thereof (e.g. controller 10, display unit 50, etc.), it is to be understood that the exemplary process is not limited to execution by the image data processing apparatus 100 but is also applicable to the apparatus 200 of FIG. 4 and others as may be appropriate When a capture mode is selected at step S61, the image sensor part 40 captures a subject and generates a first image data of the captured subject according to the control of the controller 10 in step S631.

The synchronizer 45 of the image sensor part 40 outputs the first image data, based on a subset of lines forming the frame, to the image pre-processor 13 in step S633. In an exemplary implementation, the synchronizer 45 outputs 8 lines. The image pre-processor 13 converts the first image data based on the subset of lines into second image data in step S635, and stores the converted data alternately in first and second storage areas 32 and 34 of the plural buffer memory 33 in step S637.

Next, the controller 10 connects the plural buffer memory 33 to the size adjusting unit 17 in step S639, so that an image of a subject to be captured can be output on the screen. The size adjusting unit 17 sequentially reads the second image data from the plural buffer memory 33, adjusts the read image data according to the size of the display screen, and buffers the adjusted data in step S641.

After that, the controller 10 determines whether the second image, buffered in the size adjusting unit 17, forms one frame in step S643. When the second image data does not form one frame at step S643, the controller 10 repeats steps S633 to S641 until the second image data forms one frame.

If the size adjusting unit 17 reads the second image data from the first storage area 32, the image pre-processor 13 stores the second image data in the second storage area 34. When a series of steps from S633 to S641 is performed again because the second image data has not formed one frame at S643, the size adjusting unit 17 reads the second image data from the second storage area 34. In that case, the image pre-processor 13 stores the second image data in the first storage area 32. That is, while the second image is stored in one of the storage areas (32 and 34) of the plural buffer memory 33, the second image data is simultaneously read from another one of the storage areas (34 and 32).

On the other hand, when the second image data forms one frame at step S643, the size adjusting unit 17 outputs the second image data of one frame to the display unit 50 in step S645. The display unit 50 displays the image of the subject to be captured, which corresponds to the second image data of one frame.

The controller 10 sequentially connects the plural buffer memory 33 to the size adjusting unit 17 and the image post-processor 15 to adjust the size of data and then processes the data in the image data processing method according to an exemplary embodiment of the present invention. However, it should be understood that the method can be implemented in such a way that the controller 10 sequentially connects the plural buffer memory 33 to the image post-processor 15 and the size adjusting unit 17 to encode the data and to then adjust the encoded data.

As previously described, an exemplary apparatus and method for processing image data is operated in such a way that the first image data based on partial lines, output from the image sensor part, is converted to second image data, the second image data is alternatively stored in the storage areas of plural buffer memories, and the second image data is alternatively read from the storage areas so as to be adjusted in size or to be encoded. Therefore, the apparatus and method for processing image data can reduce the necessary size of the buffer memories and can rapidly process image data output from the image sensor part.

Although exemplary embodiments of the present invention have been described in detail hereinabove, it should be understood that many variations and modifications of the basic inventive concept herein described, which may be apparent to those skilled in the art, will still fall within the spirit and scope of the exemplary embodiments of the present invention as defined in the appended claims and their equivalents.

What is claimed is:

1. A method for processing image data, the method comprising:
   processing first image data of one frame;
   converting the first image data into second image data by an image processor;
   sequentially storing the converted second image data in each of a plurality of storage areas in a plural buffer memory;
   sequentially reading the sequentially stored second image data from each of the plurality of storage areas in the plural buffer memory; and
   encoding and displaying the second image data,
   wherein during the encoding and displaying of the second image data, the second image data is read from one of the plurality of storage areas, while the second image data is stored in another one of the plurality of storage areas.

2. The method of claim 1, wherein the first image data of one frame is output, based on a subset of lines forming the frame, from an image sensor part.

3. The method of claim 1, wherein the displaying of the second image data comprises:
   adjusting the size of the sequentially read second image data corresponding to a screen standard;
   buffering the adjusted image data; and
   displaying the second image data on a screen when the buffered image data forms one frame.

4. The method of claim 1, further comprising:
   determining, when the encoded image data forms one frame, whether to store the encoded image data; and
   storing, when a storing request is input, the encoded second image data.

5. The method of claim 2, wherein the number of lines forming the subset of lines forming the frame comprises a multiple of 8.

6. A method for processing image data, the method comprising:
   processing first image data, which is output based on a subset of lines forming one frame;
   converting the first image data into second image data by an image processor;
   sequentially storing the converted second image data in a plural buffer memory having a plurality of storage areas;
   sequentially reading the sequentially stored second image data from each of the plurality of storage areas in the plural buffer memory; and
   displaying, when the read second image data forms one frame, the second image data on a screen,
   wherein during the displaying of the second image data, the second image data is read from one of the plurality of storage areas, while the second image data is stored in another one of the plurality of storage areas.

7. The method of claim 6, wherein the displaying of the second image data comprises:
   adjusting the size of the sequentially read second image data corresponding to a screen standard;
   buffering the adjusted image data; and
   displaying the second image data on a screen, when the buffered image data forms one frame.

8. The method of claim 6, wherein the number of lines forming the subset of lines forming the frame comprises a multiple of 8.

9. An apparatus for processing image data comprising:
   an image sensor part for outputting a captured frame as first image data;
   a plural buffer memory having a plurality of storage areas;
   an image pre-processor for processing the output first image data and for converting the processed first image data into second image data and sequentially storing the second image data in each of the plurality of storage areas;
   a display unit for displaying the second image data;
   an image post-processor for sequentially reading the second image data from each of the plurality of storage areas and for encoding the sequentially read second image data; and
   a size adjusting unit for sequentially reading the second image data from each of the plurality of storage areas and for outputting the size-adjusted second image data to the display unit,
   wherein, while the image post-processor and the size adjusting unit sequentially read the second image data from one of the plurality of storage areas, the image pre-processor stores the converted second image data in another one of the storage areas of the plural buffer memory.

10. The apparatus of claim 9, wherein the image sensor part outputs the first image data based on a subset of the number of lines forming the frame.

11. The apparatus of claim 9, wherein the image sensor part comprises:
   an image sensor for converting an optical signal of a captured subject into analog signals;
   an image sensor processor for converting the analog signals into the first image data, wherein the first image data is a digital signal; and
   a synchronizer for synchronizing vertical and horizontal reference signals of the digitally-converted first image data and outputting the first image data to the image pre-processor.

12. The apparatus of claim 9, wherein the size adjusting unit adjusts the size of the read second image data corresponding to a screen standard, buffers the adjusted image data, and outputs the second image data to the display unit when the sequentially read second image data is buffered and the buffered image data forms one frame.

13. The apparatus of claim 9, wherein the image post-processor performs an encoding process for the second image data until one frame of the second image data is completely encoded.

14. The apparatus of claim 10, wherein the number of lines forming the subset of lines forming the frame comprises a multiple of 8.

* * * * *